United States Patent [19]

Shridharani et al.

[11] Patent Number: 5,141,692
[45] Date of Patent: Aug. 25, 1992

[54] PROCESSING OF PIGMENTED NYLON FIBERS

[75] Inventors: Ketan G. Shridharani, Camden; Peter R. Witt, Lugoff, both of S.C.

[73] Assignee: E. I. Du Pont de Nemours and Company, Wilmington, Del.

[21] Appl. No.: 616,125

[22] Filed: Nov. 20, 1990

[51] Int. Cl.⁵ ................................................ D01F 1/04
[52] U.S. Cl. ........................... 264/210.6; 264/210.8; 264/211
[58] Field of Search .................... 264/211, 210.6, 210.8

[56] References Cited

U.S. PATENT DOCUMENTS

| | | | |
|---|---|---|---|
| 3,542,743 | 11/1970 | Flamand | 260/78 |
| 3,565,910 | 2/1971 | Elbert et al. | 260/30.8 |
| 3,583,949 | 6/1971 | Simons | 260/78 |
| 3,629,053 | 12/1971 | Kimura et al. | 264/171 |
| 3,640,942 | 2/1972 | Crampsey | 260/37 N |
| 3,846,507 | 11/1974 | Thomm et al. | 260/857 TW |
| 4,579,762 | 4/1986 | Ucci | 428/95 |

FOREIGN PATENT DOCUMENTS

| | | |
|---|---|---|
| 0035051 | 9/1981 | European Pat. Off. |
| 0373655 | 6/1990 | European Pat. Off. |
| 63-145415 | 6/1988 | Japan |

Primary Examiner—Hubert C. Lorin

[57] ABSTRACT

Draw breaks are reduced in the spinning and drawing of certain pigmented nylon filaments by incorporating at least 5% of polycaproamide in the melt shortly before spinning.

1 Claim, No Drawings

PROCESSING OF PIGMENTED NYLON FIBERS

TECHNICAL FIELD

This invention relates to methods for reducing the draw tension necessary for orienting melt-spun pigmented nylon fibers.

BACKGROUND OF THE INVENTION

Nylon can be dyed with acid or cationic dyes to give colored yarns which may be used in fabrics or carpets. Recently, yarn producers have begun incorporating colored pigments into nylon yarns to improve their resistance to degrading and fading in ultraviolet light, to give improved resistance to chemicals and noxious fumes and to give permanent coloration which is not removed by washing. While some pigments can be mixed easily into the nylon without adversely affecting the filament spinning operation, most pigments—and particularly organics—cause some difficulties while being mixed into the nylon or in subsequent melt-spinning and drawing operations. In general, organic pigments cross-link nylon, change its viscosity, form spherulites which weaken the fibers, and require increased draw tension resulting in increased filament breaks.

European Patent Publication No. 0373655 ("Anton et al"), published Jun. 20, 1990, and incorporated herein by reference, discloses processes for making stain-resistant, pigment-colored fibers with acceptable levels of spinning performance. Those processes involve forming a random nylon copolymer made with up to 4.0 weight percent of a cationic dye additive such as 5-sulfoisophthalic acid or its salts, adding up to 4.5 weight percent of a pigment concentrate to the copolymer, and melt-spinning the pigment/polymer blend. Certain pigments, however, remain very difficult to spin even using the copolymers disclosed therein.

Ways of reducing the impact of such pigments on nylon spinning and drawing performance would permit the use of a wider selection of colored pigments, both organic and inorganic, would enable fiber products to offer a complete range of styling colors without encountering serious product deficiencies or operating difficulties with any of them, and would allow for the production of high tenacity pigmented nylon fibers.

SUMMARY OF THE INVENTION

The present invention provides an improvement in a process for preparing pigmented drawn filaments of polyhexamethylene adipamide or copolyamides thereof with up to 4% by weight of hexamethylene-5-sulfoisophthalamide units wherein the polyamide is melted, pigment is added as a concentrate in a polymer matrix and the polyamide is spun into filaments and drawn, the improvement comprising, reducing the number of draw breaks by adding an amount of polycapromide to the melt before spinning, said polycaproamide being added with or by way of the pigment concentrate and in an amount equal to at least 5% by weight of the polyamide content of the filament.

DETAILED DESCRIPTION OF THE INVENTION

The present invention deals with preparation of pigmented drawn filaments of polyhexamethylene adipamide or copolymers thereof with up to 4% by weight of hexamethylene-5-sulfoisophthalamide units. Commonly the pigment is added to the melt shortly before extrusion as a concentrate. The concentrates usually contain under 50% of pigment, the remainder being a polymeric matrix carrier which helps to disperse the pigment throughout the melt. The pigments can be selected from any of a great variety available as would be well known in the art.

Unfortunately, the presence of pigment tends to exascerbate filament breakage problems at the draw rolls. These breaks, also known as draw breaks, may cause stoppage of the processing until the problem is removed or may result in yarn of poorer or unacceptable quality.

In accordance with the present invention, it has been found that addition of at least 5%, preferably at least 5.5%, by weight of polycaproamide to the melt as the matrix polymer of the concentrate and/or as a separate stream fed to the melt shortly before extrusion, will substantially reduce the number of draw breaks.

It is also common to incorporate copper in the form of cuprous or cupric ions in the polyamide fiber to provide stability against ultra-violet light degradation. This too may be added in the form of a concentrate, as is the pigment concentrate, and provides a convenient way to augment the amount of polycaproamide that is added by way of the pigment concentrate.

Finally, the polycaproamide can, if desired, be added apart from both concentrate streams.

The following examples are submitted to illustrate the invention and are not to be construed as limiting.

EXAMPLES

Example 1

A copolyamide containing 1.6% by weight of hexamethylene-5-isophthalamide units was prepared by blending hexamethylene adipate salt with a salt formed from sodium 5-sulfoisophthalate and hexamethylene diamine, polymerizing, and cutting the polymer into flake. This flake had amine ends in the range of 10–20 equivalents/$10^6$g polymer and an formic acid relative viscosity (RV) of 60–70 measured as described in col. 2, l. 42–50 of Jennings, U.S. Pat. No. 4,702,875. This polymer was then further polymerized via solid phase polymerization, and then melted using a screw melter. Lt. Wheat pigment concentrate having the composition described in Table A below was cofed to the screw melter at a rate of 4.5% based on weight of the fiber and homogeneously blended into the polymer melt. A second concentrate labeled as the copper additive in Table A was also cofed at a rate of 2% based on the weight of fiber, at the same time and also homogeneously blended into the polymer melt. The melt was spun and drawn using a draw ratio of 2.5 and then passed through a bulking jet. The final product was a 1225 denier, 19 denier per filament yarn. The total level of polycaproamide carrier resin added via the concentrate addition is 5.8%. The spinning break level for this color was 1.0 breaks/ton.

Example 2

The same copolymer and copper additive were used as in Example 1, but a pigment concentrate described as Cadet Blue in Table A was used at a rate of 4.2%. The total polycaproamide carrier resin level in this example was 5.8%. The spinning break level for this color was 4.5 breaks/ton.

Example 3

The same copolymer and copper additive were used as in Example 1, but a pigment concentrate described as Navy in Table A was used at a rate of 3.9%. The total polycaproamide carrier resin level in this example was 5.2%. The spinning break level for this color was 7.1 breaks/ton.

TABLE A

| Color | Lt. Wheat | Cadet Blue | Navy |
|---|---|---|---|
| Nylon-6 | 87.13 | 88.52 | 74.26 |
| "Elvamid"* | 5.16 | 6.11 | 14.51 |
| Channel Black PBK7 | 0.24 | 0.76 | 0.60 |
| TiO2 | 3.85 | 1.10 | — |
| Phthalo Blue PD15:2 | — | 1.94 | 6.06 |
| Carbazole Violet/PV-23 | — | 1.22 | — |
| Perylene Red PR-169 | — | — | 3.64 |
| Antimony Chrome Titanate PB-24 | 3.00 | — | — |
| FeO (Y/S) Copper Additive** | 0.30 | — | — |

*A terpolymer of nylon 6/6.6/6.10 in the proportions 46/34/20.
**CuI 0.99%, KBr 5.20%, Nylon 6 93.81%.

We claim:

1. An improved process for preparing pigmented drawn filaments of polyhexamethylene adipamide or copolyamides thereof with up to 4% by weight of hexamethylene-5-sulfoisophthalamide units wherein the polyamide is melted, pigment is added as a concentrate in a polymer matrix and the polyamide is spun into filaments and drawn, the improvement comprising, reducing the number of draw breaks by adding an amount of polycaproamide to the melt before spinning, said polycaproamide being added with or by way of the pigment concentrate and in an amount equal to at least 5% by weight of the polyamide content of the filament.

* * * * *